Figures 1, 2, 3:
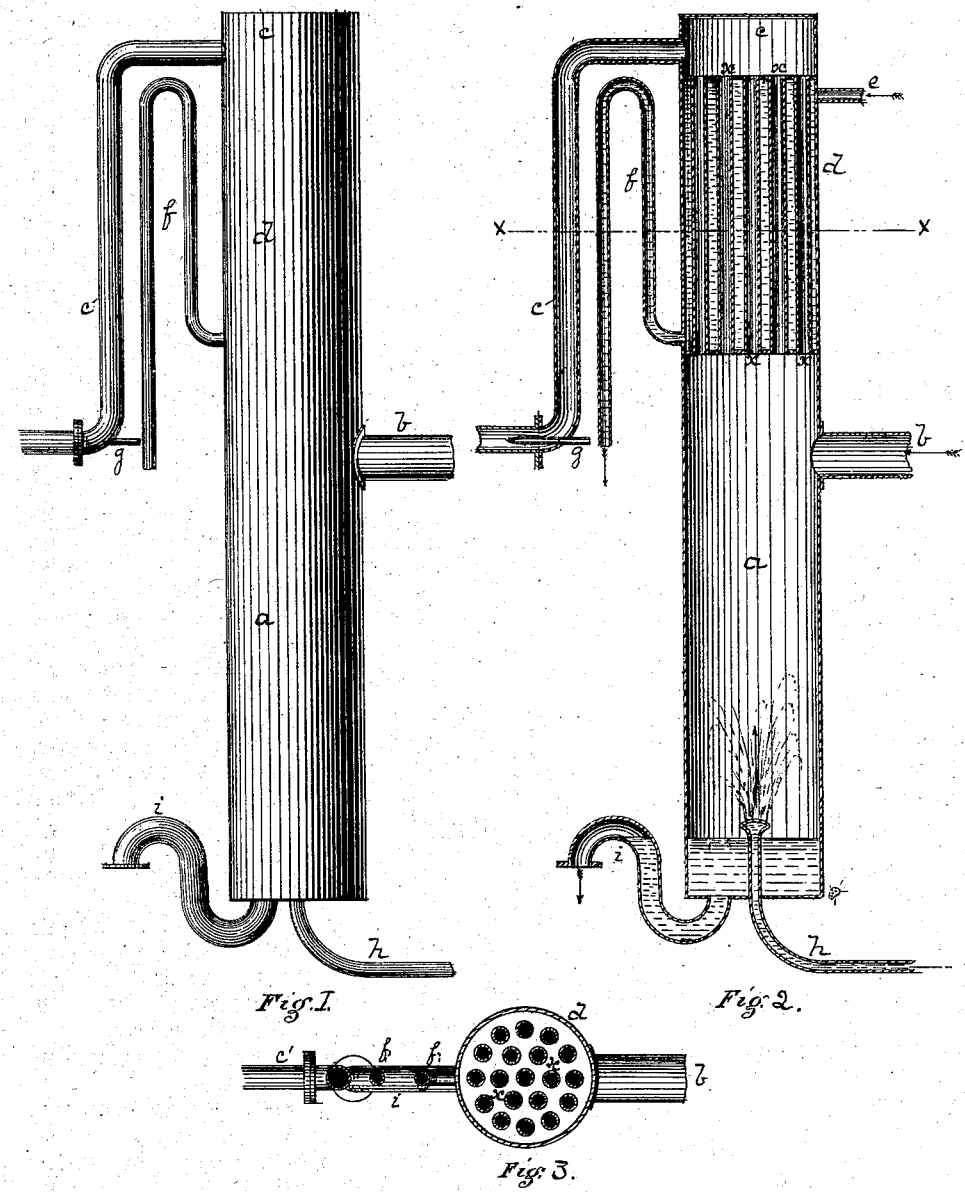

S. VAN SYCKEL.
Condensers for Hydrocarbons.

No. 154,771. Patented Sept. 8, 1874.

Witnesses: James D. Kay, Fred. Standish

Inventor: Samuel Van Syckel, by Bakewell, Christy & Kerr, his Attys.

UNITED STATES PATENT OFFICE.

SAMUEL VAN SYCKEL, OF TITUSVILLE, PENNSYLVANIA.

IMPROVEMENT IN CONDENSERS FOR HYDROCARBONS.

Specification forming part of Letters Patent No. 154,771, dated September 8, 1874; application filed November 12, 1873.

*To all whom it may concern:*

Be it known that I, SAMUEL VAN SYCKEL, of Titusville, in the county of Crawford and State of Pennsylvania, have invented a new and useful Improvement in Hydrocarbon Condensers; and I do hereby declare the following to be a full, clear, and exact description thereof, reference being had to the accompanying drawing making a part of this specification, in which—

Figure 1 is a side elevation of my improved condensing apparatus; Fig. 2 is a vertical sectional view thereof, and Fig. 3 is a transverse section through the line $x\,x$ of Fig. 2.

Like letters of reference indicate like parts in each.

My invention relates to the construction of an improved condensing apparatus, particularly designed for the condensation of vapors driven off in the distillation of hydrocarbon oils, and consists in the several features of construction substantially as hereinafter described and claimed.

To enable others skilled in the art to make and use my improvement, I will proceed to describe its construction and mode of operation.

The condensing-chamber $a$ I make of any desired diameter, but of considerable height—say, twenty feet, more or less—and introduce into it, near the upper end, the vapor-pipe $b$ which brings the vapor over from the still. Immediately above the condensing-chamber $a$ I arrange the condenser $d$, which consists of a water-chamber close at the top and bottom, except that a series of small flues, $x$, in any desired number, provide for a communication from the chamber $a$ to the gas-dome $c$ above. The height of the condenser $d$ may be varied, but for ordinary purposes should be about from twelve to fifteen feet, more or less. This condenser $d$ is supplied with water by means of a pipe, $e$, at or near its upper end, and the water, as fast as it becomes raised in temperature, is carried off from a point at or near its lower end by means of a pipe, $f$, which is shaped substantially as shown, or is provided with a cock or other suitable device, so that the water in the condenser $d$ shall preserve about the required height. By means of a pipe, $h$, with a rose or other suitable water-spraying device at its upper end, I provide for forcing a jet or spray of water into the chamber $a$ at or near its lower end, and preferably in line with its axis. By means of the pipe $c'$ the gases which ascend to the dome $c$ are carried off, and such removal of the gases is facilitated by means of a steam-jet arranged therein, as shown at $g$. The water which accumulates in the chamber $a$ along with the oil which is condensed therein, is drawn off at pleasure by means of any suitable pipe, $i$, or is allowed to flow continuously.

In operation, the vapors enter the chamber $a$ through the pipe $b$, and settling naturally toward the lower part of the chamber are met by the water-spray from the pipe $h$, which readily condenses the vapors and drives up the incondensable gases which may enter the chamber. These gases, being lighter, naturally rise and pass through the flues $x$ which extend through the condenser $d$, and any oily vapor which may be carried up thereby, will be condensed as it enters, and passes along these flues, so that little, if anything, except uncondensable or fixed gas will reach the dome $c$.

It will be observed that the condensing power of the water in the condenser $d$ increases toward the upper end of the condenser, as it has at that point the lowest temperature. The gases which thus escape into the dome $c$ are carried off by the pipe $c'$ and the jet $g$ to the fire or other point of discharge. An air-pump or other equivalent device of like function may take the place of the jet-pipe $g$.

To prevent the escape of gases or vapors through the pipe $i$, it is preferably made with a reversed elbow, as shown. It may then be left open, and the oil and water will flow off continuously as fast as they accumulate.

What I claim as my invention, and desire to secure by Letters Patent, is—

1. In combination with the vertical condensing-chamber $a$, the vapor-pipe $b$, admitting the vapors at or near its upper end, the water spray-pipe $h$ discharging upward at or near its lower end, and the supplemental tubular condenser $d$, substantially as specified.

2. The vertical condensing-chamber, having the water-spray pipe $h$, and the tubular condenser $d$, in combination with the exhaust $g$, as and for the purpose set forth.

In testimony whereof I, the said SAMUEL VAN SYCKEL, have hereunto set my hand.

SAMUEL VAN SYCKEL.

Witnesses:
G. H. CHRISTY,
T. B. KERR.